United States Patent
Endo et al.

(10) Patent No.: US 12,372,038 B2
(45) Date of Patent: Jul. 29, 2025

(54) ENGINE AND METHOD OF CONTROLLING ENGINE

(71) Applicant: MITSUBISHI HEAVY INDUSTRIES ENGINE & TURBOCHARGER, LTD., Sagamihara (JP)

(72) Inventors: Hiroyuki Endo, Sagamihara (JP); Masaki Toda, Sagamihara (JP); Sota Watanabe, Sagamihara (JP); Satoru Murata, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/833,332

(22) PCT Filed: Feb. 3, 2023

(86) PCT No.: PCT/JP2023/003523
§ 371 (c)(1),
(2) Date: Jul. 25, 2024

(87) PCT Pub. No.: WO2023/153323
PCT Pub. Date: Aug. 17, 2023

(65) Prior Publication Data
US 2025/0154910 A1    May 15, 2025

(30) Foreign Application Priority Data
Feb. 9, 2022    (JP) ................. 2022-018638

(51) Int. Cl.
*F02D 19/02* (2006.01)
*F02D 19/06* (2006.01)
*F02D 19/08* (2006.01)

(52) U.S. Cl.
CPC ....... *F02D 19/023* (2013.01); *F02D 19/0607* (2013.01); *F02D 19/0644* (2013.01); *F02D 19/0647* (2013.01); *F02D 19/081* (2013.01)

(58) Field of Classification Search
CPC .............. F02D 19/023; F02D 19/0607; F02D 19/0644; F02D 19/0647; F02D 19/081
See application file for complete search history.

(56) References Cited

U.S. PATENT DOCUMENTS

| 5,132,663 A | 7/1992 | Strobl et al. |
| 6,182,943 B1 | 2/2001 | Steinrück et al. |

(Continued)

FOREIGN PATENT DOCUMENTS

| DE | 102 15 906 A1 | 10/2003 |
| DE | 10 2008 034 221 A1 | 1/2010 |

(Continued)

OTHER PUBLICATIONS

International Search Report for PCT/JP2023/003523 (PCT/ISA/210) mailed on Mar. 20, 2023.

*Primary Examiner* — Kevin A Lathers
(74) *Attorney, Agent, or Firm* — BIRCH, STEWART, KOLASCH & BIRCH, LLP

(57) ABSTRACT

An engine is provided with: an engine body; an intake line connected to a combustion chamber of the engine body; a first fuel line configured to supply a first fuel to the intake line; a second fuel line configured to supply a second fuel having a lower explosive limit that is higher than that of the first fuel to the intake line; a first flow regulating valve disposed in the first fuel line; a second flow regulating valve disposed in the second fuel line; and a control device configured to control the first flow regulating valve and the second flow regulating valve so that the first fuel is supplied (Continued)

to the combustion chamber before the second fuel is supplied to the combustion chamber in an intake process.

10 Claims, 10 Drawing Sheets

(56) References Cited

U.S. PATENT DOCUMENTS

| | | |
|---|---|---|
| 6,845,608 B2 | 1/2005 | Klenk et al. |
| 6,964,821 B2 | 11/2005 | Hirakata |
| 7,235,322 B2 | 6/2007 | Akikusa et al. |
| 7,338,650 B2 | 3/2008 | y Escobar et al. |
| 7,617,842 B2 | 11/2009 | Curello et al. |
| 7,832,372 B2 | 11/2010 | Blank |
| 8,322,128 B2 | 12/2012 | Mitani |
| 9,490,491 B2 | 11/2016 | Adams et al. |
| 10,676,799 B2 | 6/2020 | Berlowitz et al. |
| 11,598,276 B1 * | 3/2023 | Klingbeil ............ F02D 35/023 |
| 2012/0216531 A1 | 8/2012 | Schaffeld et al. |
| 2012/0216533 A1 | 8/2012 | Schaffeld et al. |
| 2012/0221223 A1 | 8/2012 | Schaffeld et al. |
| 2013/0327286 A1 | 12/2013 | Ito |
| 2021/0404372 A1 * | 12/2021 | Klingbeil ............ F02D 41/401 |
| 2022/0018321 A1 * | 1/2022 | Kolhouse ................ F02B 1/10 |

FOREIGN PATENT DOCUMENTS

| | | |
|---|---|---|
| EP | 1 979 076 B1 | 4/2018 |
| JP | 2-290758 A | 11/1990 |
| JP | 11-294263 A | 10/1999 |
| JP | 2002-4965 A | 1/2002 |
| JP | 2005-240586 A | 9/2005 |
| JP | 3960035 B2 | 8/2007 |
| JP | 4334347 B2 | 9/2009 |
| JP | 4365118 B2 | 11/2009 |
| JP | 4682871 B2 | 5/2011 |
| JP | 4788018 B2 | 10/2011 |
| JP | 2012-172606 A | 9/2012 |
| JP | 5268190 B2 | 8/2013 |
| JP | 5351187 B2 | 11/2013 |
| JP | 2014-511452 A | 5/2014 |
| JP | 2014-511453 A | 5/2014 |
| JP | 2014-512473 A | 5/2014 |
| JP | 5503964 B2 | 5/2014 |
| JP | 5855328 B2 | 2/2016 |
| JP | 6604937 B2 | 11/2019 |

* cited by examiner

ENGINE AND METHOD OF CONTROLLING ENGINE

TECHNICAL FIELD

The present disclosure relates to an engine and a method of controlling an engine.

The present application claims priority based on Japanese Patent Application No. 2022-018638 filed on Feb. 9, 2022, the entire content of which is incorporated herein by reference.

BACKGROUND ART

In recent years, engines fueled by hydrogen or the like have been proposed for a decarbonized society, and Patent Document 1 discloses a hydrogen engine using a recirculating working gas that can be operated with high thermal efficiency by removing products with low specific heat ratio (e.g., carbon dioxide) generated in a combustion chamber from the recirculating gas.

CITATION LIST

Patent Literature

Patent Document 1: JP4682871B

SUMMARY

Problems to be Solved

The present inventors have studied a new engine that uses two or more types of fuel, and the challenge is to reduce engine damage caused by backfires in such a new engine. The engine described in Patent Document 1 is an engine fueled only by hydrogen, rather than two or more types of fuel, and the findings to solve the above problem are not disclosed.

In view of the above, an object of at least one embodiment of the present disclosure is to provide an engine and a method of controlling an engine that can reduce engine damage caused by backfires for engines that uses two or more types of fuel.

Solution to the Problems

In order to achieve the above object, an engine according to at least one embodiment of the present disclosure is provided with: an engine body; an intake line connected to a combustion chamber of the engine body; a first fuel line configured to supply a first fuel to the intake line; a second fuel line configured to supply a second fuel having a lower explosive limit that is higher than that of the first fuel to the intake line; a first flow regulating valve disposed in the first fuel line; a second flow regulating valve disposed in the second fuel line; and a control device configured to control the first flow regulating valve and the second flow regulating valve so that the first fuel is supplied to the combustion chamber before the second fuel is supplied to the combustion chamber in an intake process.

In order to achieve the above object, a control method according to at least one embodiment of the present disclosure for controlling an engine that is provided with: an engine body; an intake line connected to a combustion chamber of the engine body; a first fuel line configured to supply a first fuel to the intake line; and a second fuel line configured to supply a second fuel having a lower explosive limit that is higher than that of the first fuel to the intake line includes a step of supplying the first fuel from the first fuel line to the combustion chamber before the second fuel is supplied from the second fuel line to the combustion chamber in an intake process.

Advantageous Effects

At least one embodiment of the present disclosure provides an engine and a method of controlling an engine that can reduce engine damage caused by backfires for engines that uses two or more types of fuel.

DETAILED DESCRIPTION

Figure 1:
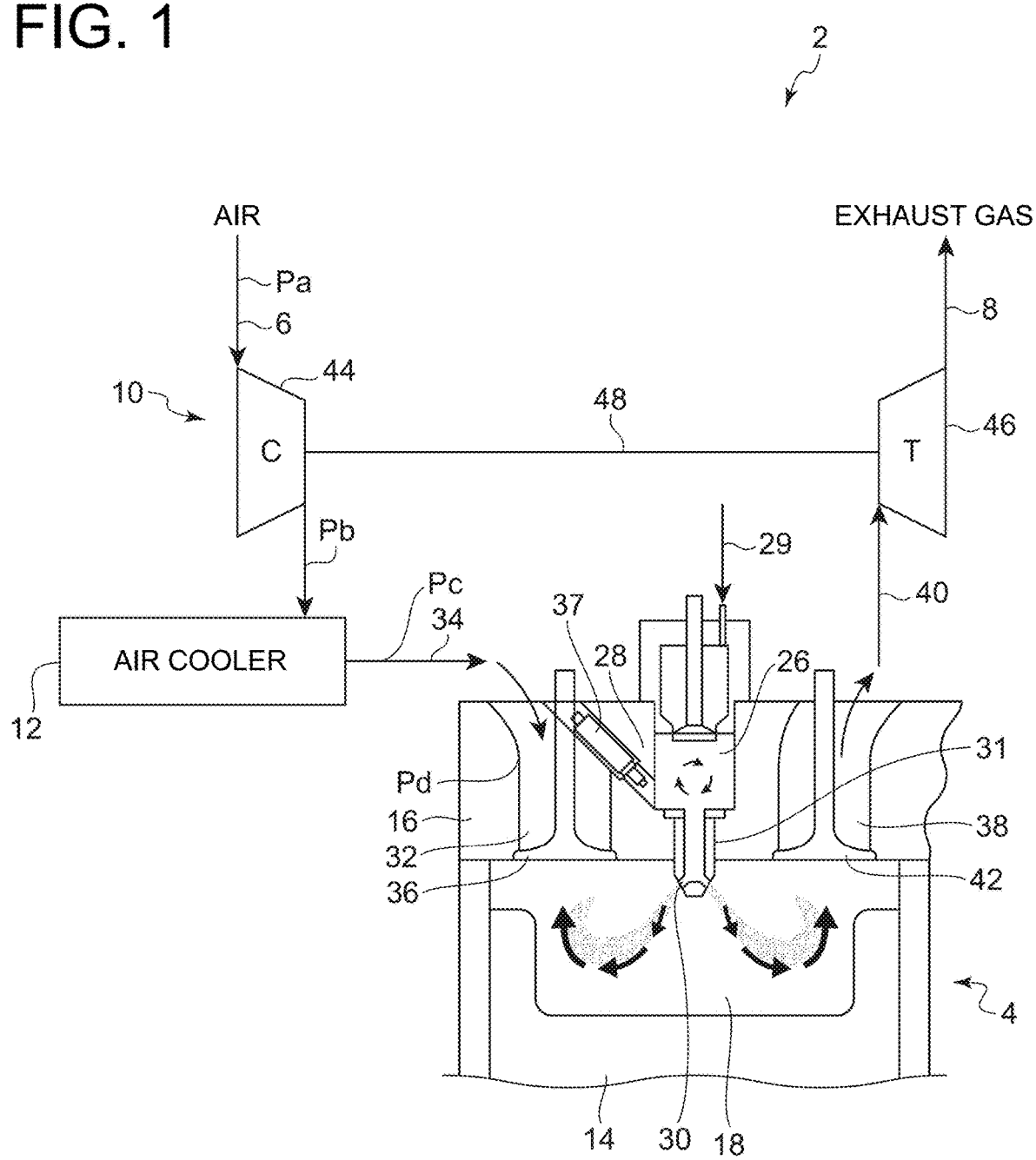
FIG. 1 is a schematic configuration diagram of a gas engine according to some embodiments of the present disclosure.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Schematic Configuration of Gas Engine)

FIG. 1 is a schematic configuration diagram of a gas engine 2 according to some embodiments of the present disclosure.

As shown in FIG. 1, the gas engine 2 is provided with an engine body 4, an intake line 6, an exhaust line 8, a turbocharger 10, and an air cooler 12.

In the example shown in FIG. 1, the gas engine 2 is a precombustion chamber gas engine, and the engine body 4 includes a main combustion chamber 18 (main chamber) defined between a piston 14 and a cylinder head 16, and a precombustion chamber 26 (auxiliary chamber) communicating with the main combustion chamber 18. The precombustion chamber 26 is a space formed inside a precombustion-chamber forming part 28 and a precombustion chamber cap 31 formed in the cylinder head 16 and communicates with the main combustion chamber 18 via a plurality of nozzle holes 30 formed in the precombustion chamber cap 31.

The intake line 6 is connected to the main combustion chamber 18 and is configured to supply a mixture (lean premixture) of at least one type of fuel gas and air to the main combustion chamber 18. The intake line 6 includes an intake port 32 formed in the cylinder head 16 and an intake pipe 34 connected to the intake port 32. One end of the intake port 32 is connected to the main combustion chamber 18, and the other end of the intake port 32 is connected to the intake pipe 34. The intake port 32 is equipped with an intake valve 36 for controlling the connection between the main combustion chamber 18 and the intake pipe 34.

The supply of fuel gas (hereinafter, referred to as precombustion chamber fuel) to the precombustion chamber 26 is directly performed through a precombustion chamber fuel line 29 connected to the precombustion chamber 26. Then, a combustion flame is generated by ignition of the fuel (precombustion chamber fuel and lean premixture flowing from main combustion chamber 18) in the precombustion chamber 26 with an ignition device (in this embodiment, ignition plug 37) disposed in the precombustion-chamber forming part 28. This combustion flame is injected from the precombustion chamber 26 to the main combustion chamber 18 via the plurality of nozzle holes 30, so that the fuel (lean premixture) in the main combustion chamber 18 is combusted.

The exhaust line 8 is connected to the main combustion chamber 18 and is configured to discharge combustion gas generated by combustion of the fuel in the main combustion chamber 18 as exhaust gas from the main combustion chamber 18. The exhaust line 8 includes an exhaust port 38 formed in the cylinder head 16 and an exhaust pipe 40 connected to the exhaust port 38. One end of the exhaust port 38 is connected to the main combustion chamber 18, and the other end of the exhaust port 38 is connected to the exhaust pipe 40. The exhaust port 38 is equipped with an exhaust valve 42 for controlling the connection between the main combustion chamber 18 and the exhaust pipe 40. The intake valve 36 and the exhaust valve 42 open and close the intake port 32 and the exhaust port 38, respectively, depending on the crank angle of the crankshaft (not shown).

The turbocharger 10 includes a compressor 44 disposed in the intake line 6, a turbine 46 disposed in the exhaust line 8, and a rotational shaft 48 connecting the compressor 44 and the turbine 46. When the turbine 46 is driven by exhaust gas flowing through the exhaust line 8, the rotation of the turbine 46 is transmitted to the compressor 44 via the rotational shaft 48, and the compressor 44 compresses air flowing through the intake line 6.

The air cooler 12 is disposed between the compressor 44 and the engine body 4 (between compressor 44 and intake port 32) in the intake line 6 and is configured to cool air that is heated by compression in the compressor 44.

(Configuration Example of Fuel Line of Gas Engine)

Figure 2:
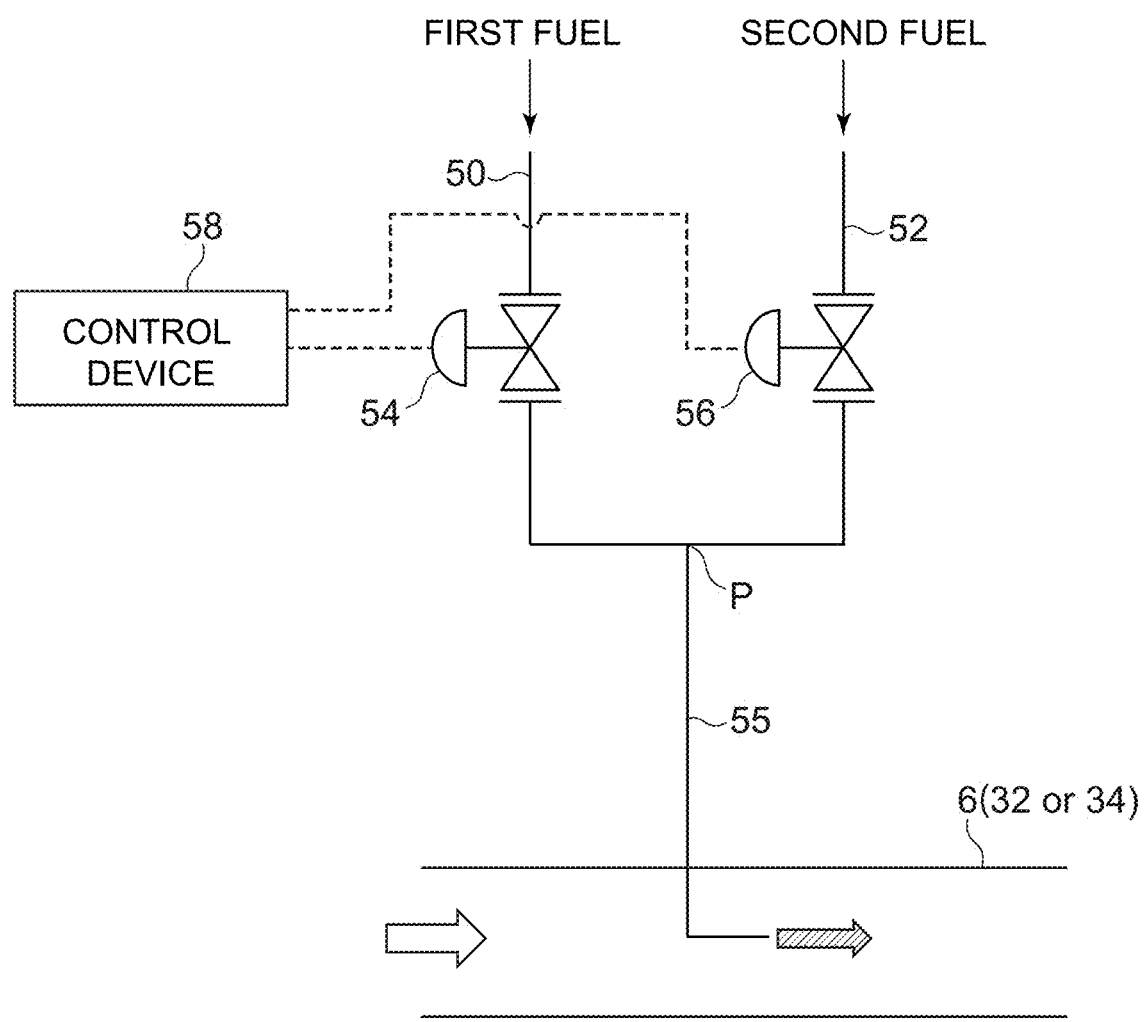
FIG. 2 is a diagram showing an example of a configuration for supplying fuel gas to intake line.

The above-described gas engine 2 is configured to supply two or more types of fuel gas (two types in the illustrated example) to the intake line 6, as shown in FIG. 2, for example.

As shown in FIG. 2, the gas engine 2 is provided with a first fuel line 50 configured to supply the first fuel to the intake line 6, a second fuel line 52 configured to supply the second fuel having a lower explosive limit that is higher than that of the first fuel to the intake line 6, a first flow regulating valve 54 disposed in the first fuel line 50, a second flow regulating valve 56 disposed in the second fuel line 52, and a control device 58 configured to control the first flow regulating valve 54 and the second flow regulating valve 56.

In the example shown in FIG. 2, the first fuel line 50 and the second fuel line 52 join and then connect to the intake line 6. Specifically, the first fuel line 50 is connected (merged) to the second fuel line 52 at position P downstream of the first flow regulating valve 54 and downstream of the second flow regulating valve 56, and the first fuel line 50 and the second fuel line 52 share a common line part 55 which connects the position P and the intake line 6.

The first fuel is a main gaseous component of fuel gas supplied from the first fuel line 50 to the intake line 6 and may be, for example, any of hydrogen, methane, propane, n-butane, carbon monoxide, and ammonia. The second fuel is a main gaseous component of fuel gas supplied from the second fuel line to the intake line 6 and may be, for example, any of hydrogen, methane, propane, n-butane, carbon monoxide, and ammonia with a lower explosive limit that is higher than that of the first fuel. For example, the first fuel may be hydrogen, and the second fuel may be methane. Alternatively, for example, the first fuel may be methane, and the second fuel may be ammonia. The lower explosive limits of hydrogen, methane, propane, n-butane, carbon monoxide, and ammonia are 4.0%, 5.0%, 2.1%, 1.8%, 12.5%, and 15.0%, respectively. The concentration of the first fuel in the gas flowing through the first fuel line and the concentration of the second fuel in the gas flowing through the second fuel line may be, for example, not less than 50% or not less than 80% each.

Figure 3:
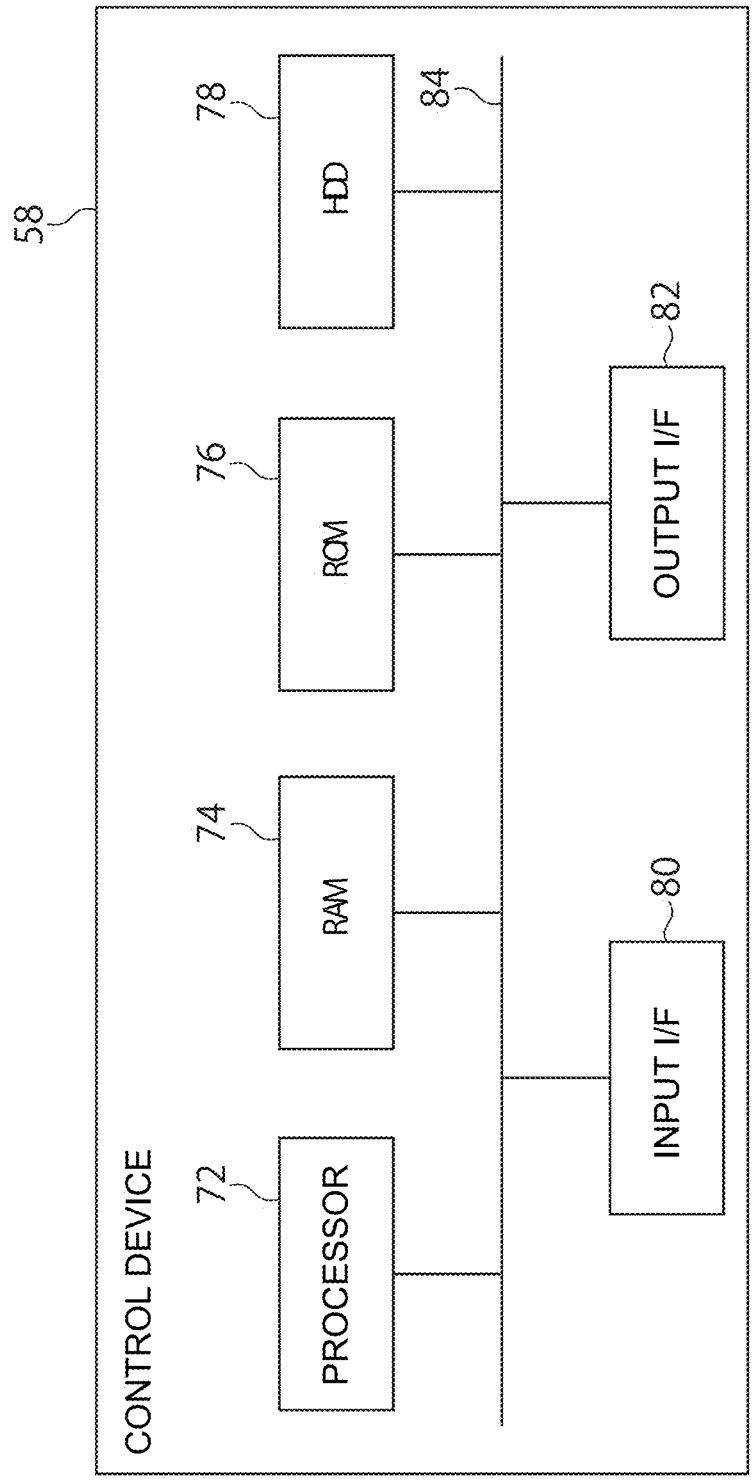
FIG. 3 is a diagram showing an example of a hardware configuration of control device.

FIG. 3 is a diagram showing an example of a hardware configuration of the control device 58.

As shown in FIG. 3, the control device 58 may be provided by a computer including a processor 72, a random access memory (RAM) 74, a read only memory (ROM) 76, a hard disk drive (HDD) 78, an input I/F 80, and an output I/F 82, which are connected via a bus 84, for example. The hardware configuration of the control device 58 is not limited to the above, and may be configured by a combination of a control circuit and a storage device. The control device 58 is provided by executing a program that realizes each function of the control device 58 by the computer. The function of each unit of the control device 58 described below is realized by, for instance, loading a program stored in the ROM 76 into the RAM 74 and executing the program by the processor 72, and reading and writing data in the RAM 74 or the ROM 76.

FIGS. 4 to 10 are diagrams showing examples of the timing of opening/closing of each of the intake valve 36 and the exhaust valve 42 and the timing of supplying each of the first fuel and the second fuel to the main combustion chamber 18 within one combustion cycle of the gas engine 2. In each of FIGS. 4 to 10, the horizontal axis represents the crank angle (or time) and the vertical axis represents the fuel flow rate or the effective opening area of each of the intake valve 36 and the exhaust valve 42.

In some embodiments, for example, as shown in FIGS. 4 to 10, the control device 58 controls the first flow regulating valve 54 and the second flow regulating valve 56 so that the first fuel is supplied to the main combustion chamber 18 before the second fuel is supplied to the main combustion chamber 18 in the intake process of the gas engine 2.

In conventional gas engines, when fuel gas is supplied from the intake line to the main combustion chamber during the intake process, the fuel gas supplied to the intake line in the latter half of the intake process tends to remain in the intake line after the intake valve is closed. Therefore, at the timing when the intake valve opens in the next intake process (e.g., timing A in FIG. 4), the gas in the main combustion chamber may flow slightly backward into the intake line, which may ignite the fuel gas remaining in the intake line and cause backfires.

In contrast, in some embodiments shown in FIGS. 4 to 10, as described above, the first fuel, which has a relatively low lower explosive limit among the first and second fuels, is supplied to the main combustion chamber 18 before the second fuel in the intake process of the gas engine 2. This reduces the amount of the first fuel, which has a relatively low lower explosive limit and is likely to cause backfires, remaining in the intake line 6 when the intake process is completed (when the intake valve 36 is closed in the intake process), compared to the case where the first fuel is supplied to the main combustion chamber 18 after the second fuel. Thus, it is possible to reduce the risk of backfires and suppress damage to the gas engine 2 caused by backfires.

For example, when the first fuel is hydrogen and the second fuel is methane, the use of hydrogen reduces carbon dioxide emissions compared to using only methane as fuel. Hydrogen has a lower lower explosive limit and a higher combustion rate than methane, but supplying hydrogen before methane reduces the amount of hydrogen remaining in the intake line 6 after the intake valve 36 is closed, suppressing damage to the gas engine 2 caused by hydrogen-induced backfires.

Alternatively, when the first fuel is methane and the second fuel is ammonia, the use of ammonia reduces carbon dioxide emissions compared to using only methane as fuel. Further, since methane has a lower lower explosive limit and a higher combustion rate than ammonia, supplying methane before ammonia reduces the amount of methane remaining in the intake line 6 after the intake valve 36 is closed, suppressing damage to the gas engine 2 caused by methane-induced backfires.

Figure 4:
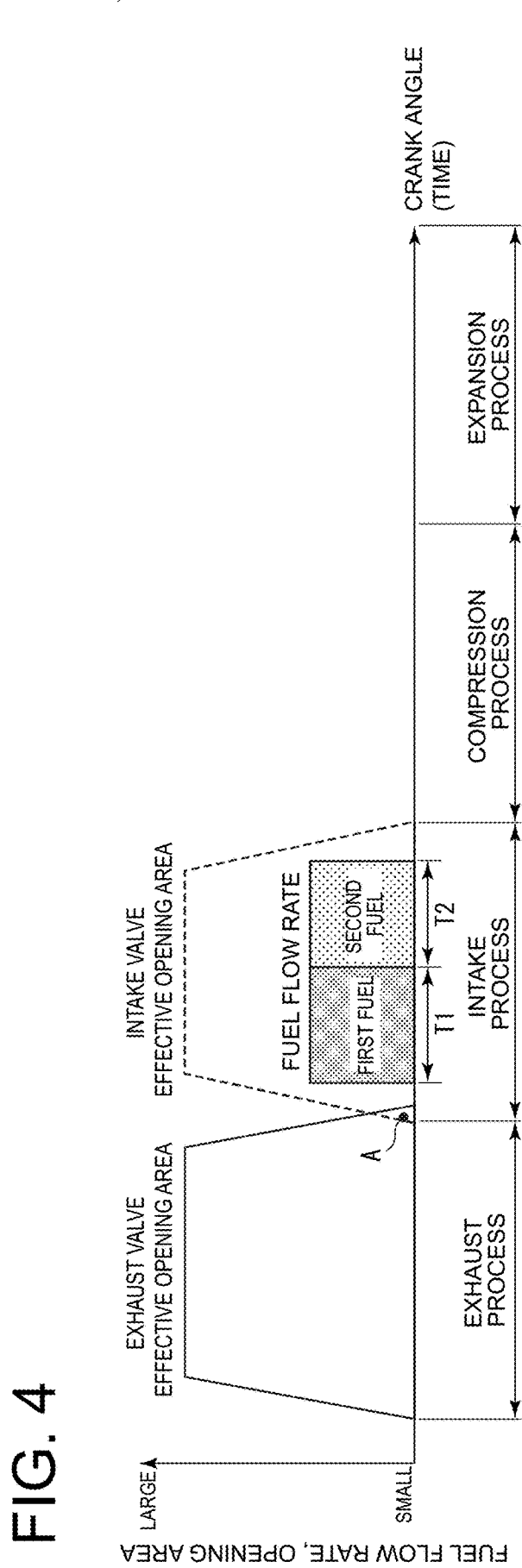
FIG. 4 is a diagram showing an example of the timing of supplying each of first fuel and second fuel to main combustion chamber within one combustion cycle of gas engine.

In an embodiment, for example, as shown in FIG. 4, the control device 58 may control the first flow regulating valve 54 and the second flow regulating valve 56 so that the first fuel is supplied to the main combustion chamber 18 during the first period T1 in the intake process and the second fuel is supplied to the main combustion chamber 18 during the second period T2 that is consecutive to the first period T1 in the intake process. In the example shown in FIG. 4, the first fuel is supplied to the main combustion chamber 18 at a constant flow rate during the first period T1 in an earlier part of the intake process, and the second fuel is supplied to the main combustion chamber 18 at a constant flow rate during the second period T2 in a later part of the intake process.

Figure 5:
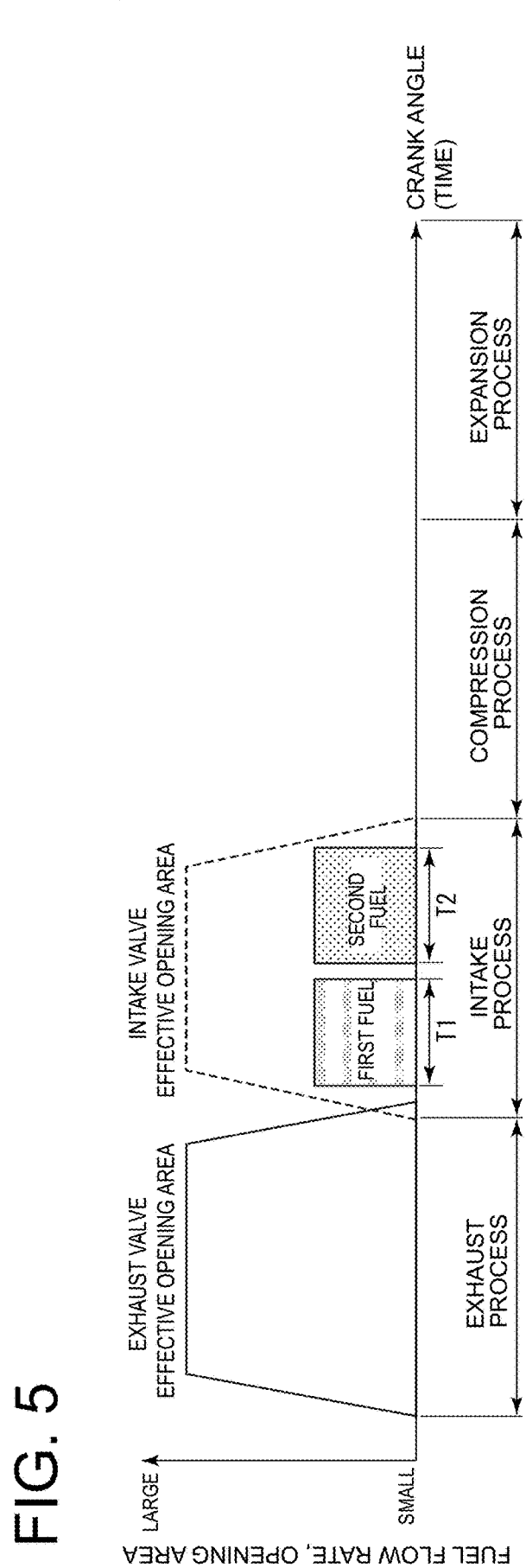
FIG. 5 is a diagram showing another example of the timing of supplying each of first fuel and second fuel to main combustion chamber within one combustion cycle of gas engine.

In an embodiment, for example, as shown in FIG. 5, the control device 58 may control the first flow regulating valve 54 and the second flow regulating valve 56 so that the first fuel is supplied to the main combustion chamber 18 during the first period T1 in the intake process and the second fuel is supplied to the main combustion chamber 18 during the second period T2 after a certain time interval from the first period T1 in the intake process. In the example shown in FIG. 5, the first fuel is supplied to the main combustion chamber 18 at a constant flow rate during the first period T1 in an earlier part of the intake process, the first and second fuels are not supplied to the main combustion chamber 18 during the period between the first period T1 and the second period T2, and the second fuel is supplied at a constant flow rate to the main combustion chamber 18 during the second period T2 in a later part of the intake process.

According to the control shown in FIG. 5, the time difference between the end of period T1, in which the first fuel with a relatively low lower explosive limit among the first and second fuels (i.e., fuel that is likely to cause backfires) is supplied, and the end of period T2, in which the second fuel with a relatively high lower explosive limit (i.e., fuel that is unlikely to cause backfires) is supplied, can be large. This increases the effect of reducing the risk of backfires and effectively suppresses damage to the gas engine 2 caused by backfires.

Figure 6:
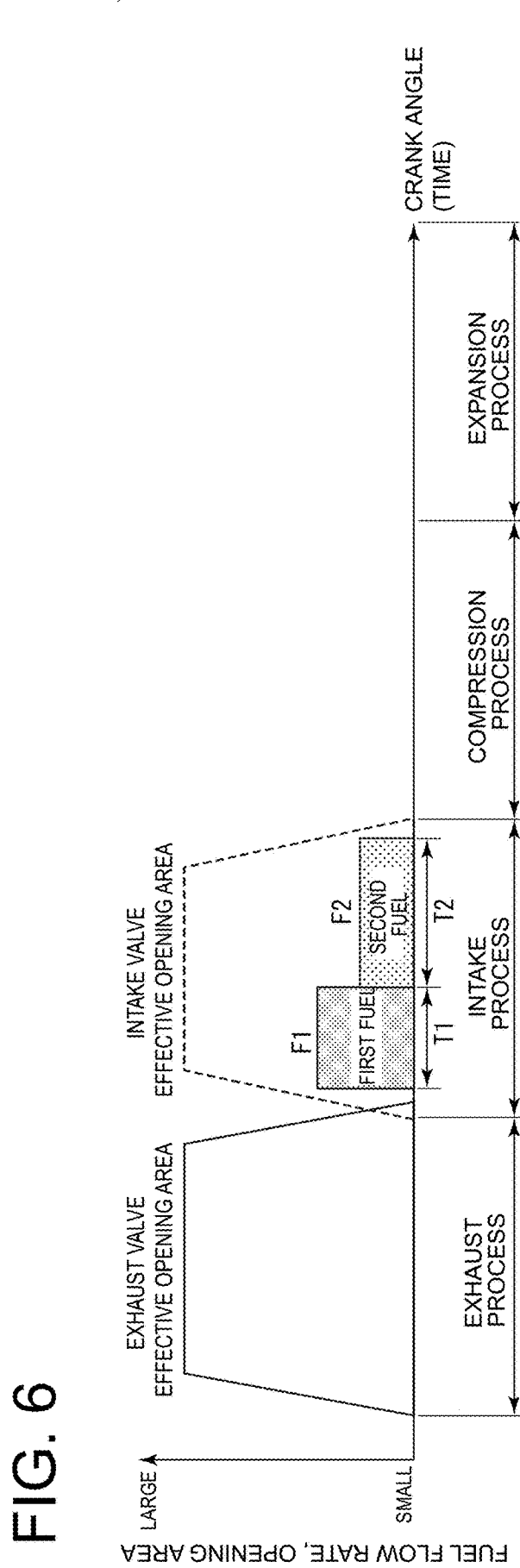
FIG. 6 is a diagram showing another example of the timing of supplying each of first fuel and second fuel to main combustion chamber within one combustion cycle of gas engine.

In an embodiment, for example, as shown in FIG. 6, the control device 58 may control the first flow regulating valve 54 and the second flow regulating valve 56 so that the second period T2, in which the second fuel is supplied to the main combustion chamber 18, is longer than the first period T1, in which the first fuel is supplied to the main combustion chamber 18 in the intake process. In the example shown in FIG. 6, the first fuel is supplied to the main combustion chamber 18 at a constant flow rate F1 during the first period T1 in an earlier part of the intake process, and the second fuel is supplied to the main combustion chamber 18 at a constant flow rate F2 smaller than the flow rate F1 during the second period T2 that is consecutive to the first period T1.

According to the control shown in FIG. 6, the time difference between the end of period T1, in which the first fuel with a relatively low lower explosive limit among the first and second fuels (i.e., fuel that is likely to cause backfires) is supplied, and the end of period T2, in which the second fuel with a relatively high lower explosive limit (i.e., fuel that is unlikely to cause backfires) is supplied, can be large. This increases the effect of reducing the risk of backfires and effectively suppresses damage to the gas engine 2 caused by backfires.

Figure 7:
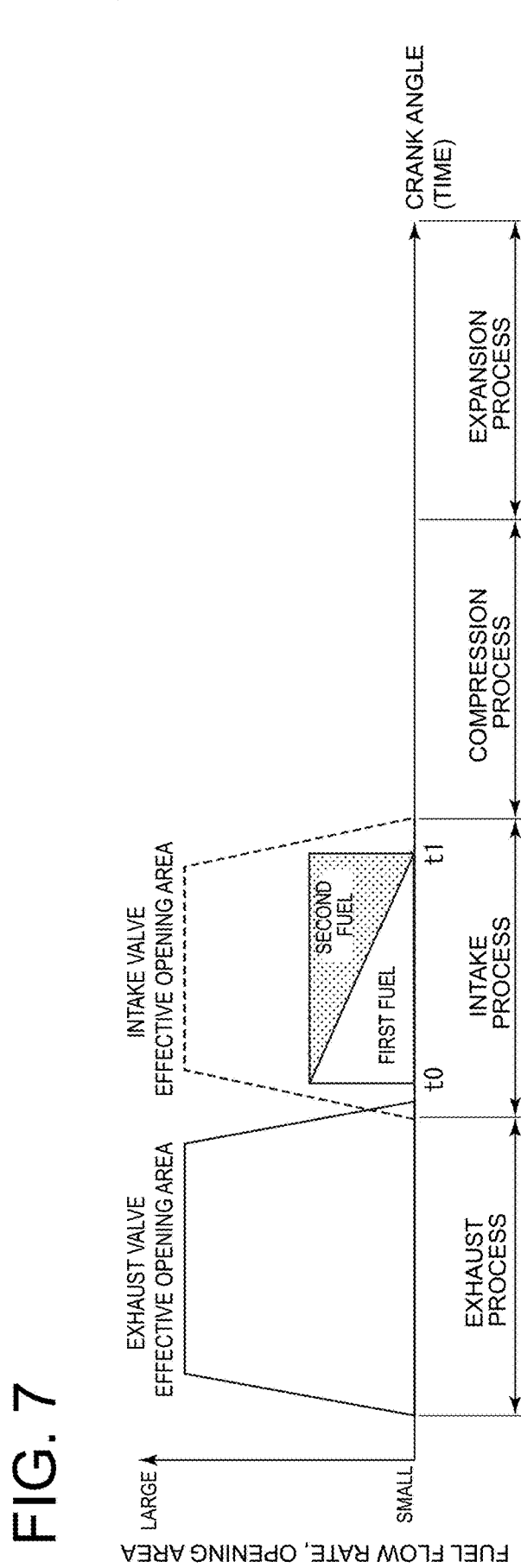
FIG. 7 is a diagram showing another example of the timing of supplying each of first fuel and second fuel to main combustion chamber within one combustion cycle of gas engine.
Figure 8:
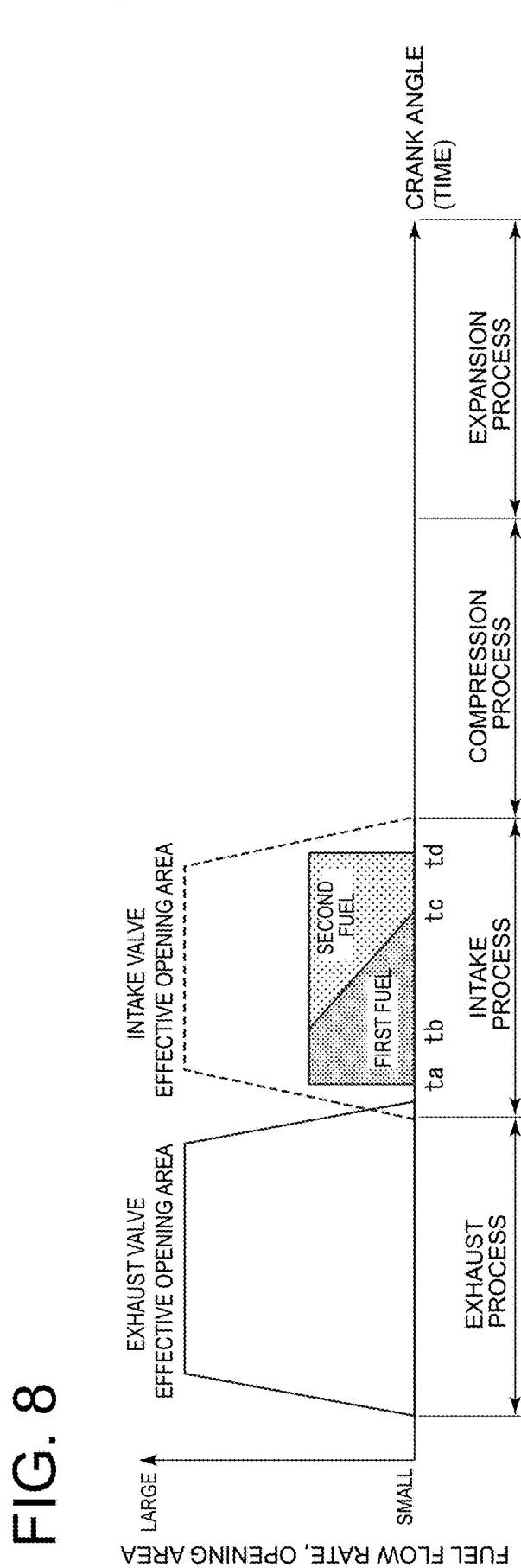
FIG. 8 is a diagram showing another example of the timing of supplying each of first fuel and second fuel to main combustion chamber within one combustion cycle of gas engine.
Figure 9:
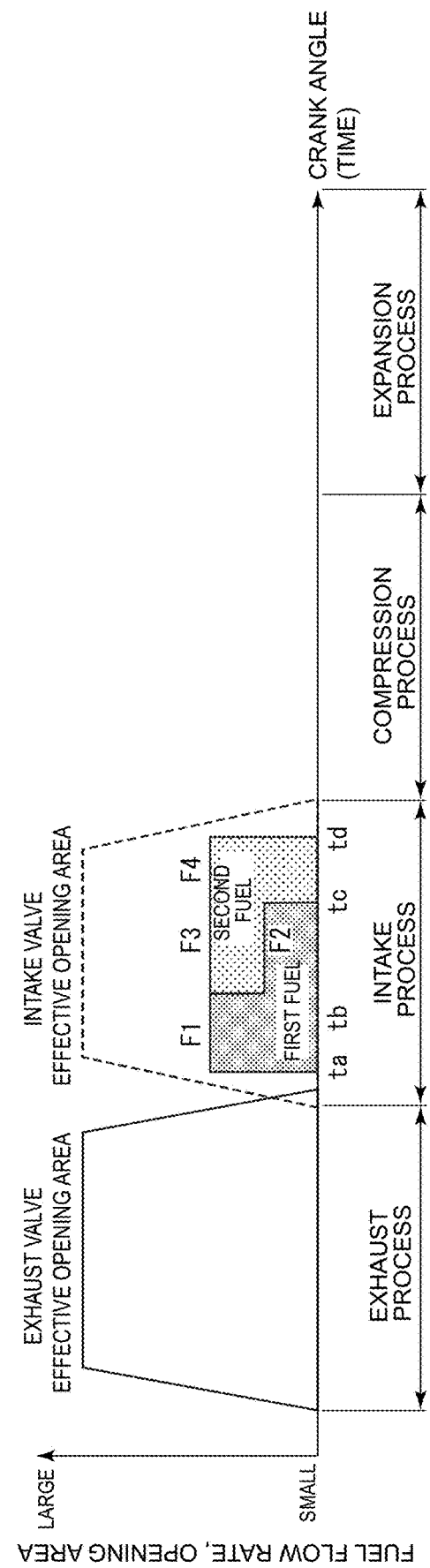
FIG. 9 is a diagram showing another example of the timing of supplying each of first fuel and second fuel to main combustion chamber within one combustion cycle of gas engine.

In some embodiments, for example, as shown in FIGS. 7 to 9, the control device 58 may control the first flow regulating valve 54 and the second flow regulating valve 56 so that the flow rate of the first fuel to the main combustion chamber 18 is decreased with time while the flow rate of the second fuel to the main combustion chamber 18 is increased with time in the intake process.

In this case, for example, as shown in FIG. 7, from time t0 to time t1 in the intake process, the flow rate of the first fuel to the main combustion chamber 18 may be gradually (linearly in the illustrated example) decreased and the flow rate of the second fuel to the main combustion chamber 18 may be gradually (linearly in the illustrated example) increased.

In the example shown in FIG. 8, the first fuel is supplied to the main combustion chamber 18 at a constant flow rate during the period from time ta to tb in the intake process, the flow rate of the first fuel to the main combustion chamber 18 is then gradually (linearly in the illustrated example) decreased during the period from time tb to tc, and the flow rate of the first fuel to the main combustion chamber 18 is set to zero during the period from time tc to time td. Further, the flow rate of the second fuel to the main combustion chamber 18 is set to 0 during the period from time ta to tb in the intake process, the flow rate of the second fuel to the main combustion chamber 18 is then gradually (linearly in the illustrated example) increased during the period from time tb to tc, and the second fuel is supplied to the main combustion chamber 18 at a constant flow rate during the period from time tc to time td.

In the example shown in FIG. 9, from time ta to time td in the intake process, the flow rate of the first fuel to the main combustion chamber 18 is stepwise decreased with time and the flow rate of the second fuel to the main combustion chamber 18 is stepwise increased with time. In the example shown in FIG. 9, the first fuel is supplied to the main combustion chamber 18 at a constant flow rate F1 during the period from time ta to tb, the first fuel is then supplied to the main combustion chamber 18 at a constant flow rate F2 smaller than the flow rate F1 during the period from time tb to tc, and the flow rate of the first fuel to the main combustion chamber 18 is set to zero during the period from time tc to time td. Further, the flow rate of the second fuel to the main combustion chamber 18 is set to 0 during the period from time ta to tb, the first fuel is supplied to the main combustion chamber 18 at a constant flow rate F3 during the period from time tb to tc, and the first fuel is supplied to the main combustion chamber 18 at a constant flow rate F4 larger than the flow rate F3 during the period from time tc to time td.

According to the control shown in each of FIGS. 7 to 9, the risk of backfires can be reduced while reducing the risk of combustion deterioration due to poor mixing of the two types of fuel gas (first fuel and second fuel) in the main combustion chamber 18.

The present disclosure is not limited to the embodiments described above, but includes modifications to the embodiments described above, and embodiments composed of combinations of those embodiments.

Figure 10:
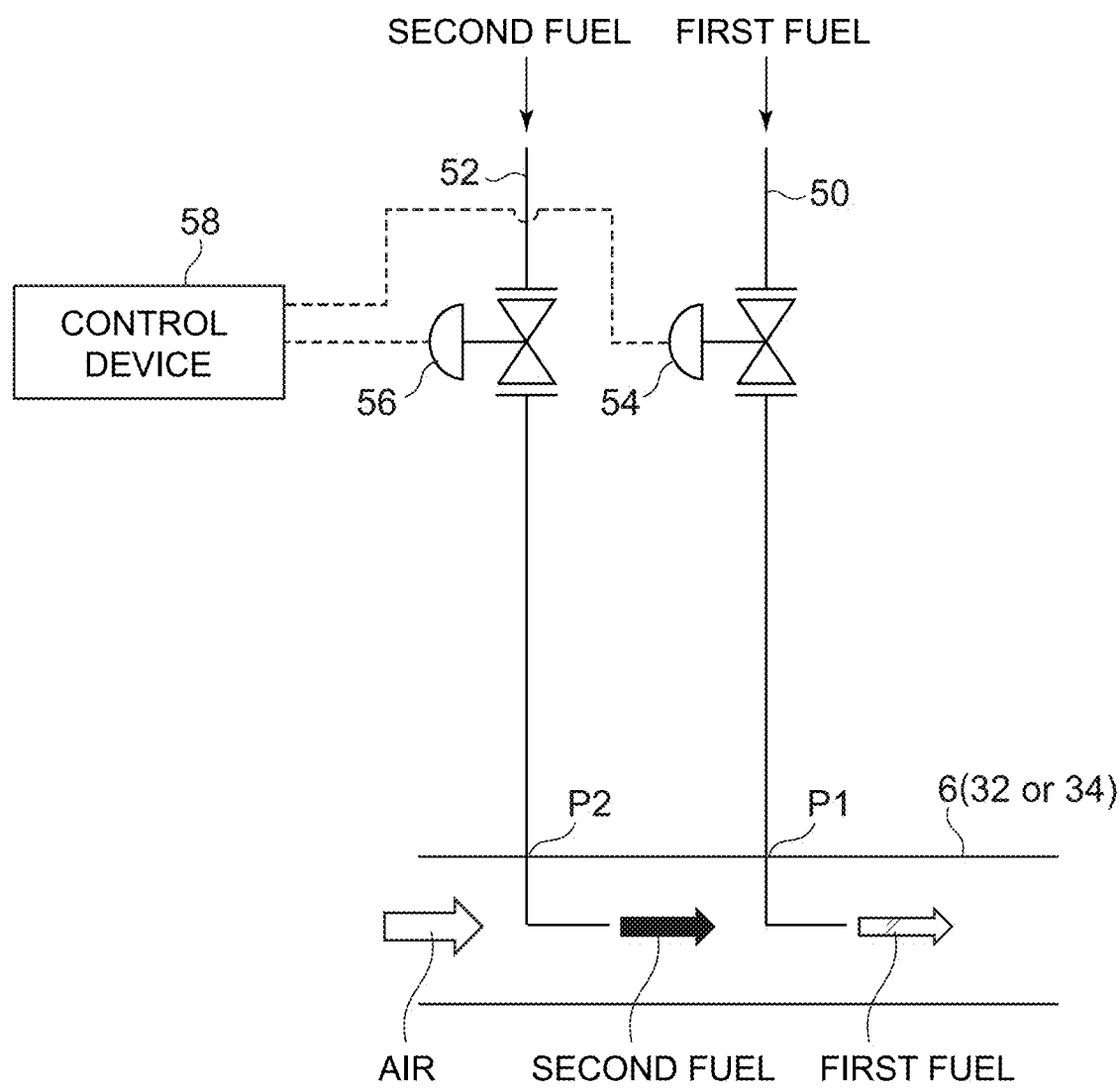
FIG. 10 is a diagram showing another example of a configuration for supplying fuel gas to intake line.

For example, in the example shown in FIG. 2, the first fuel line 50 and the second fuel line 52 join and then connect to the intake line 6, but as shown in FIG. 10, for example, the first fuel line 50 may be connected to the intake line 6 at the first position P1, and the second fuel line 52 may be connected to the intake line 6 at the position P2 upstream of the first position P1.

Also in this case, the control of the first flow regulating valve 54 and the second flow regulating valve 56 described using FIGS. 4 to 9 (control of supplying the first fuel to the main combustion chamber 18 before supplying the second fuel to the main combustion chamber 18 in the intake process) can be performed in the same manner by the control device 58 to reduce the risk of backfires and suppress engine damage caused by backfires. Further, since the first fuel, which has a lower explosive limit that is lower than the second fuel, is more likely to cause backfires than the second fuel, by setting the first position P1 where the first fuel line is connected to the intake line 6 downstream from the position P2 where the second fuel line is connected to the intake line 6 as described above, in the event of a backfire, the area affected by the backfire in the intake line 6 can be reduced, and damage to the gas engine 2 caused by the backfire can be suppressed.

The gas engine may supply three or more types of fuel gas to the intake line 6. In this case, three or more types of fuel may be supplied to the main combustion chamber 18, starting with the fuel with the lowest lower explosive limit. Thus, it is possible to reduce the risk of backfires and suppress damage to the gas engine 2 caused by backfires.

The gas engine does not have to be a precombustion chamber gas engine, and the gas engine does not have to have a precombustion chamber.

The present disclosure is not limited to gas engines, but can also be applied to diesel engines, for example. The "lower explosive limit" described above may be read as "lower limit of combustible range" or "lower limit of combustion range". Also, "low lower explosive limit" can be read as "high explosive grade". The higher explosive grade takes precedence over the lower lower explosive limit. If the explosive grade is the same, the judgment is made by the lower explosive limit.

In the example shown in FIG. 10, the second fuel line 52 is connected to the intake line 6 at a position upstream of where the first fuel line 50 is connected, but the second fuel line 52 may be connected to the intake line 6 at the same position in the intake air flow direction as where the first fuel line 50 is connected. In this case, the first fuel line 50 and the second fuel line 52 may be connected to different circumferential positions of the pipe constituting the intake line 6.

The contents described in the above embodiments would be understood as follows, for instance.

(1) An engine (e.g., the above-described gas engine 2) according to at least one embodiment of the present disclosure is provided with: an engine body (e.g., the above-described engine body 4); an intake line (e.g., the above-described intake line 6) connected to a combustion chamber (e.g., the above-described main combustion chamber 18) of the engine body; a first fuel line (e.g., the above-described first fuel line 50) configured to supply a first fuel (e.g., any of the above-described hydrogen, methane, propane, n-butane, carbon monoxide, and ammonia) to the intake line; a second fuel line (e.g., the above-described second fuel line 52) configured to supply a second fuel having a lower explosive limit that is higher than that of the first fuel (e.g., any of the above-described hydrogen, methane, propane, n-butane, carbon monoxide, and ammonia having a lower explosive limit that is higher than that of the first fuel) to the intake line; a first flow regulating valve (e.g., the above-described first flow regulating valve 54) disposed in the first fuel line; a second flow regulating valve (e.g., the above-described second flow regulating valve 56) disposed in the second fuel line; and a control device (e.g., the above-described control device 58) configured to control the first flow regulating valve and the second flow regulating valve so that the first fuel is supplied to the combustion chamber before the second fuel is supplied to the combustion chamber in an intake process.

Conventionally, when fuel gas is supplied from the intake line to the main combustion chamber during the intake process, the fuel gas supplied to the intake line in the latter half of the intake process tends to remain in the intake line after the intake valve is closed. Therefore, at the timing when the intake valve opens in the next intake process, the gas in the combustion chamber may flow slightly backward into the intake line, which may ignite the fuel gas remaining in the intake line and cause backfires.

In contrast, in the engine described in (1), the control device controls the first flow regulating valve and the second flow regulating valve so that the first fuel is supplied to the combustion chamber before the second fuel is supplied to the combustion chamber in the intake process. Thus, the first fuel, which has a relatively low lower explosive limit among the first and second fuels, is supplied to the combustion chamber before the second fuel in the intake process to reduce the amount of the first fuel, which has a relatively low lower explosive limit and is likely to cause backfires, remaining in the intake line when the intake process is completed (when the intake valve is closed in the intake process), compared to the case where the first fuel is supplied to the combustion chamber after the second fuel. Thus, it is possible to reduce the risk of backfires and suppress damage to the engine caused by backfires.

(2) In some embodiments, in the engine described in the above (1), when a period (e.g., the above-described period T1) during which the first fuel is supplied to the combustion chamber in the intake process is a first period, the control device is configured to control the first flow regulating valve and the second flow regulating valve so that the second fuel is supplied to the combustion chamber during a second period (e.g., the above-described period T2) that is consecutive to the first period in the intake process.

With the engine described in (2), it is possible to reduce the risk of backfires and suppress damage to the gas engine 2 caused by backfires.

(3) In some embodiments, in the engine described in the above (1), when a period (e.g., the above-described period T1) during which the first fuel is supplied to the combustion chamber in the intake process is a first period, the control device is configured to control the first flow regulating valve and the second flow regulating valve so that the second fuel is supplied to the combustion chamber during a second period (e.g., the above-described period T2) after a certain time interval from the first period in the intake process.

With the engine described in (3), the time difference between the end of first period, in which the first fuel with a relatively low lower explosive limit among the first and second fuels (i.e., fuel that is likely to cause backfires) is supplied, and the end of second period, in which the second fuel with a relatively high lower explosive limit (i.e., fuel that is unlikely to cause backfires) is supplied, can be large. This increases the effect of reducing the risk of backfires and effectively suppresses damage to the engine caused by backfires.

(4) In some embodiments, in the engine described in any one of the above (1) to (3), when a period (e.g., the above-described period T1) during which the first fuel is supplied to the combustion chamber in the intake process is a first period, and a period (e.g., the above-described period T2) during which the second fuel is supplied to the combustion chamber in the intake process is a second period, the control device is configured to control the first flow regulating valve and the second flow regulating valve so that the second period is longer than the first period.

With the engine described in (4), the time difference between the end of first period, in which the first fuel with a relatively low lower explosive limit among the first and second fuels (i.e., fuel that is likely to cause backfires) is supplied, and the end of second period, in which the second fuel with a relatively high lower explosive limit (i.e., fuel that is unlikely to cause backfires) is supplied, can be large. This increases the effect of reducing the risk of backfires and effectively suppresses damage to the engine caused by backfires.

(5) In some embodiments, in the engine described in the above (1), the control device is configured to control the first flow regulating valve and the second flow regulating valve so that flow rate of the first fuel to the combustion chamber is decreased with time while flow rate of the second fuel to the combustion chamber is increased with time in the intake process.

With the engine described in (5), the risk of backfires can be reduced while reducing the risk of combustion deterioration due to poor mixing of the first fuel and the second fuel in the combustion chamber.

(6) In some embodiments, in the engine described in any one of the above (1) to (5), the first fuel line is connected to the intake line at a first position (e.g., the above-described position P1). The second fuel line is connected to the intake line at a position (e.g., the above-described position P2) upstream of the first position.

With the engine described in (5), the first fuel line and the second fuel line are independent, which facilitates control of the fuel supply amount for each fuel line.

(7) In some embodiments, in the engine described in any one of the above (1) to (5), the first fuel line and the second fuel line join and then connect to the intake line.

With the engine described in (6), the fuel line can be connected to the intake line at a single position.

(8) In some embodiments, in the engine described in any one of the above (1) to (7), the first fuel is hydrogen, and the second fuel is methane.

With the engine described in (8), carbon dioxide emissions can be reduced by using hydrogen compared to conventional engines that use only methane as fuel. Hydrogen has a lower lower explosive limit and a higher combustion rate than methane, but supplying hydrogen before methane reduces the amount of hydrogen remaining in the intake line after the intake valve is closed, suppressing damage to the engine caused by hydrogen-induced backfires.

(9) In some embodiments, in the engine described in any one of the above (1) to (7), the first fuel is methane or hydrogen, and the second fuel is ammonia.

With the engine described in (9), carbon dioxide emissions can be reduced by using ammonia compared to conventional engines that use only methane as fuel. Further, since methane has a lower lower explosive limit and a higher combustion rate than ammonia, supplying methane or hydrogen before ammonia reduces the amount of methane remaining in the intake line after the intake valve is closed, suppressing damage to the engine caused by methane-induced backfires.

(10) A control method according to at least one embodiment of the present disclosure for controlling an engine that is provided with: an engine body; an intake line connected to a combustion chamber of the engine body; a first fuel line configured to supply a first fuel to the intake line; and a second fuel line configured to supply a second fuel having a lower explosive limit that is higher than that of the first fuel to the intake line includes a step of supplying the first fuel from the first fuel line to the combustion chamber before the second fuel is supplied from the second fuel line to the combustion chamber in an intake process.

Conventionally, when fuel gas is supplied from the intake line to the main combustion chamber during the intake process, the fuel gas supplied to the intake line in the latter half of the intake process tends to remain in the intake line after the intake valve is closed. Therefore, at the timing when the intake valve opens in the next intake process, the gas in the combustion chamber may flow slightly backward into the intake line, which may ignite the fuel gas remaining in the intake line and cause backfires.

In contrast, in the engine control method described in (10) includes the step of supplying the first fuel to the combustion chamber before the second fuel is supplied to the combustion chamber in the intake process. Thus, the first fuel, which has a relatively low lower explosive limit among the first and second fuels, is supplied to the combustion chamber before the second fuel in the intake process. This reduces the amount of the first fuel, which has a relatively low lower explosive limit and is likely to cause backfires, remaining in the intake line when the intake process is completed (when the intake valve is closed in the intake process), compared to the case where the first fuel is supplied to the combustion chamber after the second fuel. Thus, it is possible to reduce the risk of backfires and suppress damage to the engine caused by backfires.

REFERENCE SIGNS LIST

2 Gas engine
4 Engine body
6 Intake line
8 Exhaust line
10 Supercharger
12 Air cooler
14 Piston
16 Cylinder head
18 Main combustion chamber
26 Precombustion chamber
28 Precombustion-chamber forming part
29 Precombustion chamber fuel line
30 Nozzle hole
31 Precombustion chamber cap
32 Intake port
34 Intake pipe
36 Intake valve
37 Ignition plug
38 Exhaust port
40 Exhaust pipe
42 Exhaust valve
44 Compressor
46 Turbine
48 Rotational shaft
50 First fuel line
52 Second fuel line
54 First flow regulating valve
55 Common line part
56 Second flow regulating valve
58 Control device
72 Processor
74 RAM
76 ROM
78 HDD
80 Input I/F
82 Output I/F
84 Bus

The invention claimed is:

1. An engine, comprising:
an engine body;
an intake line connected to a combustion chamber of the engine body;
a first fuel line configured to supply a first fuel to the intake line;
a second fuel line configured to supply a second fuel having a lower explosive limit that is higher than that of the first fuel to the intake line;
a first flow regulating valve disposed in the first fuel line;
a second flow regulating valve disposed in the second fuel line; and
a control device configured to control the first flow regulating valve and the second flow regulating valve so that the first fuel is supplied to the combustion chamber before the second fuel is supplied to the combustion chamber in an intake process.

2. The engine according to claim 1,
wherein when a period during which the first fuel is supplied to the combustion chamber in the intake process is a first period, the control device is configured to control the first flow regulating valve and the second flow regulating valve so that the second fuel is supplied to the combustion chamber during a second period that is consecutive to the first period in the intake process.

3. The engine according to claim 1,
wherein when a period during which the first fuel is supplied to the combustion chamber in the intake process is a first period, the control device is configured to control the first flow regulating valve and the second flow regulating valve so that the second fuel is supplied to the combustion chamber during a second period after a certain time interval from the first period in the intake process.

4. The engine according to claim 1,
wherein when a period during which the first fuel is supplied to the combustion chamber in the intake process is a first period, and a period during which the second fuel is supplied to the combustion chamber in the intake process is a second period, the control device is configured to control the first flow regulating valve and the second flow regulating valve so that the second period is longer than the first period.

5. The engine according to claim 1,
wherein the control device is configured to control the first flow regulating valve and the second flow regulating valve so that flow rate of the first fuel to the combustion chamber is decreased with time while flow rate of the second fuel to the combustion chamber is increased with time in the intake process.

6. The engine according to claim 1,
wherein the first fuel line is connected to the intake line at a first position, and
wherein the second fuel line is connected to the intake line at a position upstream of the first position.

7. The engine according to claim 1,
wherein the first fuel line and the second fuel line join and then connect to the intake line.

8. The engine according to claim 1,
wherein the first fuel is hydrogen, and
wherein the second fuel is methane.

9. The engine according to claim 1,
wherein the first fuel is methane or hydrogen, and
wherein the second fuel is ammonia.

10. A method of controlling an engine,
the engine comprising:
an engine body;
an intake line connected to a combustion chamber of the engine body;
a first fuel line configured to supply a first fuel to the intake line; and a second fuel line configured to supply a second fuel having a lower explosive limit that is higher than that of the first fuel to the intake line;

the method comprising:

a step of supplying the first fuel from the first fuel line to the combustion chamber before the second fuel is supplied from the second fuel line to the combustion chamber in an intake process.

* * * * *